United States Patent [19]

Tang et al.

[11] Patent Number: 5,268,939
[45] Date of Patent: Dec. 7, 1993

[54] CONTROL SYSTEM AND METHOD FOR A NUCLEAR REACTOR

[75] Inventors: Calvin K. Tang, Sunnyvale; Wayne Marquino, San Jose, both of Calif.

[73] Assignee: General Electric Company, San Jose, Calif.

[21] Appl. No.: 963,187

[22] Filed: Oct. 19, 1992

[51] Int. Cl.$^5$ .................................................. G21C 7/00
[52] U.S. Cl. ...................................... 376/210; 376/211
[58] Field of Search ........................ 376/210, 211, 215

[56] References Cited

U.S. PATENT DOCUMENTS

| | | | |
|---|---|---|---|
| 4,424,186 | 1/1984 | Cook | 376/211 |
| 4,472,345 | 9/1984 | Tanji et al. | 376/211 |
| 4,478,783 | 10/1984 | Broadwater | 376/211 |
| 4,832,898 | 5/1989 | Miranda | 376/215 |
| 4,912,732 | 3/1990 | Singh | 376/211 |
| 5,118,461 | 6/1992 | Fujii | 376/210 |

OTHER PUBLICATIONS

General Electric Company, "Dynamic System Design, Pressure Control," Sification 22A7110, Nov. 4, 1980, sheets 1-70.
General Electric Company, "BWR/6 General Description of a Boiling Water Reactor," Sep. 1980, pp: i, ii, 1—1 to 1-6, 6-1 to 6-18.

Primary Examiner—Donald P. Walsh
Assistant Examiner—Frederick H. Voss
Attorney, Agent, or Firm—J. S. Beulick

[57] ABSTRACT

A nuclear reactor is joined to a steam turbine by a main steamline for discharging steam thereto. A plurality of flow control valves regulate flow to the turbine, and a bypass valve selectively bypasses a portion of the steam around the turbine to its condenser. A pressure regulator and turbine controller are operatively joined to the control valves and the bypass valve for controlling steamflow to the turbine. An apparatus for detecting failure of one of the control valves is operatively connected to the bypass valve, and upon failure of one of the control valves to channel sufficient flowrate, the bypass valve is automatically opened to reduce reactor pressure rise. The failure detecting apparatus also provides a reduction demand signal for reducing reactor power for allowing the bypass valve to close.

11 Claims, 2 Drawing Sheets

CONTROL SYSTEM AND METHOD FOR A NUCLEAR REACTOR

The present invention relates generally to nuclear reactors, and, more specifically, to a system and method for controlling steamflow to a steam turbine powered by the reactor.

BACKGROUND OF THE INVENTION

A nuclear reactor such as a boiling water reactor (BWR) includes a pressure vessel containing a nuclear reactor core submerged in water which is heated thereby for generating steam. The steam is channeled through a main steamline to a steam turbine which powers a generator for producing electrical power for an electrical utility grid. The output power of the reactor is primarily controlled by a recirculation flow control system (RFCS) which typically includes jet pumps inside the pressure vessel which are powered by external recirculation pumps which selectively control recirculation of the water within the pressure vessel and through the core. Increased recirculation increases the power output of the reactor, and thereby increases the steamflow through the main steamline to the turbine for increasing electrical power from the generator.

Disposed in the main steamline are a plurality of conventional control valves which are selectively openable and closeable for regulating the amount of steamflow to the turbine. Disposed upstream from the control valves is one or more bypass valves which are selectively opened for bypassing a portion of the main steamflow around the control valves and turbine directly to the main condenser of the turbine as required to reduce the rate of reactor pressure rise as the control valves are closed during operation, for example. A pressure control system includes a pressure regulator operatively joined to the control valves and bypass valve for maintaining a predetermined pressure within the reactor in response to the steamflow, or flowrate. A turbine control system includes a turbine controller also operatively joined to the control valves and the bypass valve for controlling flow of the main steam to the turbine in conjunction with the pressure regulator. A low value gate is provided between the pressure regulator and the turbine controller for selecting the lesser of the two demands therefrom to provide a control valve flow demand to the control valves for controlling the operation thereof. Where the control valve flow demand is predeterminedly less than the demand from the pressure regulator, the bypass valve is automatically opened to dump a portion of the main steam into the condenser to prevent undesirable reactor pressure rise, for example.

Associated with each of the pressure regulator and the turbine controller are conventional demand limiters. The limiter for the pressure regulator limits the total steamflow demand collectively through the control valves and the bypass valves to prevent a failure in the control system from causing excessive steamflow from the reactor, also known as blowdown. Blowdown is a conventionally known occurrence which reduces the water level in the reactor and the pressure therein which can lead to conventionally known transition boiling in the fuel bundles therein, which can damage the fuel by overheating. The limiter associated with the turbine controller limits the steamflow through the turbine to prevent damage thereto due to excessive flow.

Faults which cause one or more of the control valves to fall in a closed position reducing or preventing flow therethrough relative to the normally demanded flowrate therefor will necessarily cause the reactor pressure to increase. The pressure regulator will then increase the flow demand to the control valves for reducing the increasing reactor pressure. However, the pressure regulator limiter will prevent the control valves and bypass valve from fully opening since the limit is predetermined for preventing the undesirable blowdown occurrence. If the reactor is operating at a sufficiently high power level, the steamflow through the operable, non-failed control valves and bypass valve will be insufficient to avoid reactor pressure increase, which will then cause the reactor protection system to effect a reactor scram to shut down the reactor. The increased reactor pressure will reduce transition boiling margin which may lead to fuel damage by overheating thereof.

However, the capacity of the operable, non-failed control valves and bypass valve in most boiling water reactors is typically sufficient to accommodate the transient caused by failure of a single control valve without requiring a reactor shutdown. However, this additional capacity is unavailable for use in conventional reactors since the limiters are required to ensure safe operation of the reactor under other modes of operation. The pressure regulator limiter limits the opening magnitude of both the control valves and the bypass valve to prevent undesirable blowdown, for example. And, the turbine controller limiter limits the magnitude of opening of the control valves to prevent excessive flow to the turbine.

OBJECTS OF THE INVENTION

Accordingly, one object of the present invention is to provide a new and improved system and method for controlling a nuclear reactor powering a steam turbine.

Another object of the present invention is to provide a control system and method which detect a control valve failure and open the bypass valve for reducing reactor pressure rise.

Another object of the present invention is to provide a control system and method for opening the bypass valve in magnitude greater than that permitted by the pressure controller limiter.

Another object of the present invention is to provide a control system and method which open the bypass valve upon a control valve failure, and reduce reactor power for allowing the bypass valve to close.

SUMMARY OF THE INVENTION

A nuclear reactor is joined to a steam turbine by a main steamline for discharging steam thereto. A plurality of flow control valves regulate flow to the turbine, and a bypass valve selectively bypasses a portion of the steam around the turbine to its condenser. A pressure regulator and turbine controller are operatively joined to the control valves and the bypass valve for controlling steamflow to the turbine. An apparatus for detecting failure of one of the control valves is operatively connected to the bypass valve, and upon failure of one of the control valves to channel sufficient flowrate, the bypass valve is automatically opened to reduce reactor pressure rise. The failure detecting apparatus also provides a reduction demand signal for reducing reactor power for allowing the bypass valve to close.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
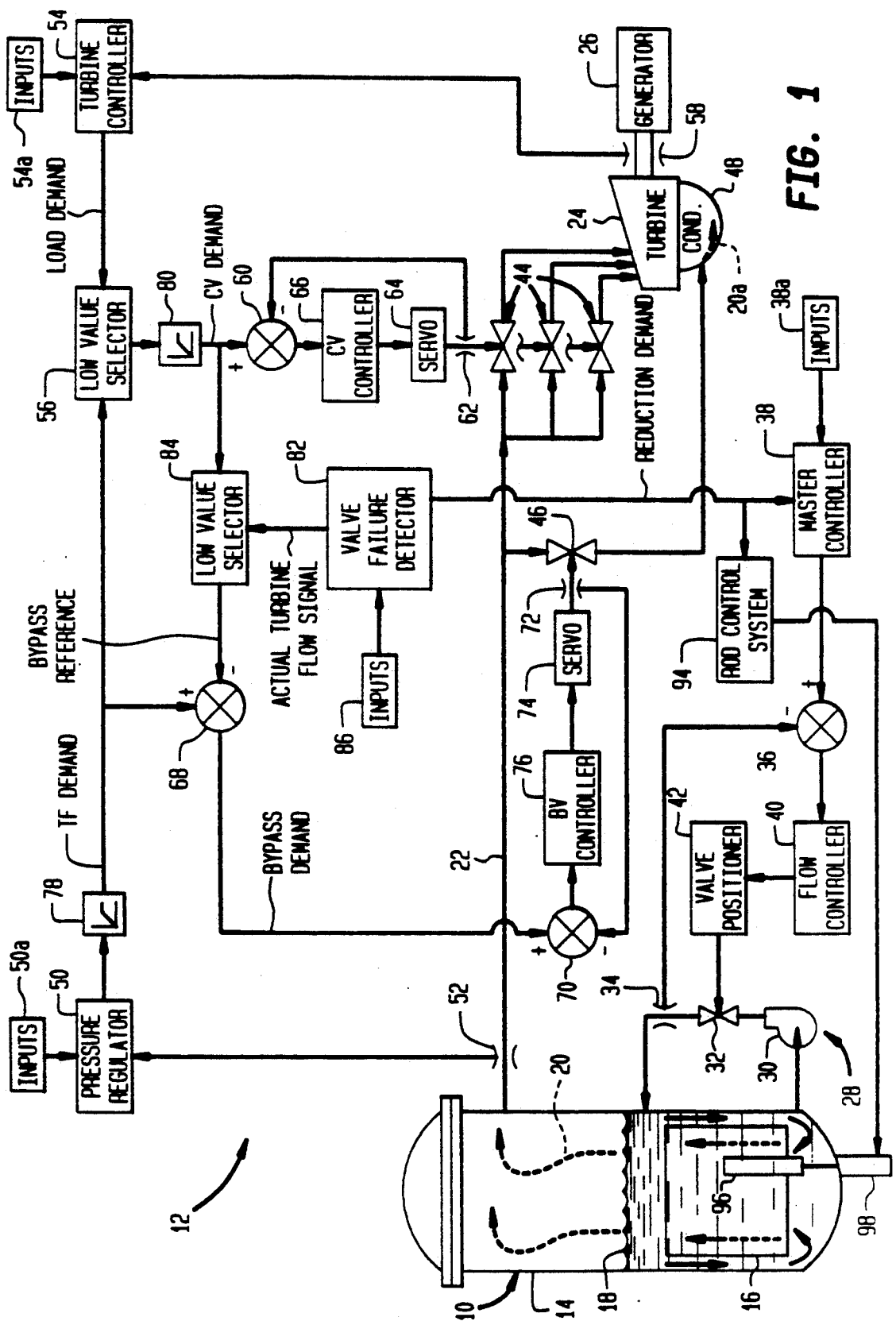
FIG. 1 is a schematic representation of a system and method for controlling operation of a nuclear reactor in accordance with one embodiment of the present invention.

Illustrated schematically in FIG. 1 is a nuclear reactor 10 in the exemplary form of a boiling water reactor (BWR), and a control system 12 therefor. The reactor 10 includes a pressure vessel 14 having a reactor core 16 submerged under reactor water 18 therein. During operation, the core 16 heats the water 18 for generating main steam 20 under pressure for discharge through a main steamline 22 to a conventional steam turbine 24 disposed in flow communication with the reactor 10. The main steam 20 provided to the turbine 24 rotates an output shaft of the turbine 24 for powering a conventional electrical generator 26 which provides electrical power to a conventional utility grid.

One manner of regulating power of the reactor 10 is a conventional recirculation flow control system (RFCS) 28 which selectively varies the recirculation flow of the water 18 through the core 16 in the vessel 14. The RFCS 28 includes a conventional recirculation pump 30 joined in flow communication with the vessel 14 for receiving therefrom a portion of the water 18 and discharging the water 18 under pressure through a conventional control valve 32 which is conventionally disposed in flow communication with the vessel 14 for returning thereto the water 18 for powering a conventional jet pump (not shown), for example, for circulating the water 18 through the core 16. A conventional closed-loop feedback control includes a flow sensor 34 which provides a flow signal to a conventional comparator 36, which also receives a recirculation flow demand signal from a conventional master controller 38. The difference, or error, between these two signals is provided by the comparator 36 to a conventional flow controller 40 which controls a conventional valve positioner or servomotor 42 which mechanically opens and closes the control valve 32 as desired in response to the error signal. In this way, the flow through the control valve 32, and therefore the recirculation flow through the core 16, is controlled in a conventional feedback loop in response to a demand signal from the master controller 38 and the feedback flow signal from the sensor 34. The master controller 38 is provided with conventional inputs 38a such as a signal indicative of the desired reactor power. By increasing recirculation flow of the water 18 through the core 16, power of the reactor 10 may be increased for increasing the volume, or flowrate, of the main steam 20 channeled through the main steamline 22.

Conventionally disposed in parallel flow communication in the steamline 22 are a plurality of conventional flow control or modulating valves 44, three being shown for example, for controlling flow of the main steam 20 from the reactor 10 to the turbine 24. At least one conventional bypass valve 46 is disposed in flow communication with the steamline 22 upstream of the control valves 44 and with a conventional main condenser 48 of the turbine 24 for selectively bypassing a portion of the main steam 20 as bypass steam 20a around the control valves 44 and the turbine 24 for direct flow to the condenser 48 without passage firstly through the turbine 24. The bypass valve 46 is conventionally provided to bypass, or dump the bypass steam 20a into the condenser 48 whenever more steam is available than required by the turbine 24 during operation, for example.

In a conventional BWR, pressure of the main steam 20 is controlled by a conventional pressure control system including a conventional pressure regulator or controller 50 operatively joined to the control valves 44 and the bypass valve 46 for controlling flow of the main steam 20 to the turbine 24, and for controlling the amount of bypass steam 20a bypassed directly to the condenser 48. A conventional pressure sensor 52 provides a pressure signal to the regulator 50 which may conventionally be either the pressure of the main steam 20 in the reactor pressure vessel 14 or the pressure of the main steam 20 at the inlet to the turbine 24. The pressure of the main steam 20 is, therefore, conventionally regulated using the sensed pressure thereof and conventionally modulating the control valves 44.

A conventional turbine control system including a conventional turbine controller 54 is also operatively joined to the control valves 44 and the bypass valve 46 in conjunction with the pressure regulator 50 for controlling flow of the main steam 20 to the turbine 24, as is conventionally known.

More specifically, the pressure regulator 50 receives conventional inputs 50a, such as pressure setpoint, and dynamically generates or computes a total steamflow (TF) demand in the form of an electrical signal which is indicative of the required total steamflow through the several control valves 44. A conventional first low value selector or gate 56 is operatively joined between the pressure regulator 50 and the turbine controller 54 for receiving the TF demand from the pressure regulator 50 and a conventional speed-load, or simply load, demand from the turbine controller 54. The turbine controller 54 receives conventional inputs 54a such as the desired load demand for the turbine-generator 24, 26, for example, and conventionally also receives a feedback speed signal from a conventional speed sensor 58 which monitors the rotational speed of the turbine-generator 24, 26.

During normal operation with the generator 26 locked on to the utility grid and the turbine 24 operating at its synchronous speed, the load demand from the turbine controller 54 is predeterminedly higher than the TF demand from the regulator 50, and the low value selector 56 will, therefore, select the lesser thereof, e.g. TF demand, as a control valve (CV) flow demand, in the form of an electrical signal for controlling flowrate of the several control valves 44. During an overspeed condition of the turbine 24, for example, the turbine controller 54 provides override capability of the pressure regulator 50 and, therefore, the load demand will be selected in such instance by the first selector 56.

Accordingly, during normal operation of the reactor 10 the pressure regulator 50 controls flow through the control valves 44, and the CV demand has the value of the TF demand. The CV demand is conventionally used in feedback operation in redundant closed-loops for the several control valves 44 including for each control valve loop, for example, a conventional comparator 60 which receives the CV demand from the first selector 56 and subtracts therefrom an actual position signal for the respective control valve 44 provided by an conventional position sensor 62 operatively joined to a conventional valve positioner or servomotor 64 which selectively opens and closes the control valve 44. A conventional control valve (CV) controller 66 is operatively joined to the first selector 56 through the comparator 60 for receiving from the selector 56 the CV demand from which is subtracted in the comparator 60 the actual position signal from the position sensor 62 for generating a difference or error signal used by the CV controller 66 to position the control valve 54 at the desired position.

The control of each control valve 44 is conventional and is typically provided with redundant control circuits to ensure proper operation of the control valves 44. Accordingly, the control valves 44 are selectively opened and closed as required in response to desired power levels of the reactor 10 and for maintaining a substantially constant pressure of the main steam 20 as regulated by the pressure regulator 50.

During a mode of operation of the turbine 24 requiring a substantial reduction in flow of the main steam 20 thereto, the bypass valve 46 is conventionally operated to bypass the undesired, excess portion of the main steam 20 as the bypass flow 20a directly to the condenser 48. More specifically, the steam bypass system including the bypass valve 46 also includes a conventional bypass comparator 68 which is operatively joined to both the pressure regulator 50 and the first selector 56 for receiving from the former the TF demand, and receiving from the latter the CV demand, which two signals are compared by the comparator 68 to determine the magnitude of steamflow that must be bypassed directly to the maim turbine condenser 48 in order to maintain adequate pressure control. The difference of the two signals obtained by the comparator 68 is the bypass demand, in the form of an electrical signal, which is conventionally provided to a conventional closed-loop feedback control system for the bypass valve 46. The bypass feedback control system includes a conventional comparator 70 which receives the bypass demand and also receives an actual position signal from a conventional position sensor 72 operatively connected to a conventional valve positioner or servomotor 74 which conventionally selectively opens or closes the bypass valve 46. The comparator 70 provides a difference or error signal to a conventional bypass valve (BV) controller 76 which controls operation of the servomotor 74 to selectively control operation of the bypass valve 46 in a conventional fashion.

The control system 12 described above is conventional in structure and function and is implemented in conventional control system components or computers in redundant circuits as desired. The control system 12 further conventionally includes conventional first and second limiters 78 and 80 to ensure that the respective signals from the pressure regulator 50 and the turbine controller 54 do not exceed predetermined ranges including predetermined maximum values for ensuring safe operation of the reactor 10.

More specifically, the first limiter 78 is operatively joined between the pressure regulator 50 and the first selector 56 and provides a predetermined limit to the total steamflow (TF) demand which limits the total flow through all of the control valves 44 and bypass valve 46 in the event that they are all opened simultaneously. This is done to prevent, for example, a condition known as blowdown wherein a failure in the control system causes excessive steamflow from the reactor 10 through the main steamline 22 which would drop the water level within the vessel 14 and depressurize the vessel 14. This could then lead to conventional transition boiling of the water adjacent the fuel bundles within the core 16 which could damage the fuel by overheating. By suitably limiting the opening of the control valves 44 and the bypass valve 46, the total steamflow therethrough is limited in response to the TF demand limit provided by the first limiter 78.

The second limiter 80 is conventionally operatively joined between the first selector 56 and the comparator 60 to conventionally limit the value of the load demand to a preferred range with a predetermined maximum value. By limiting the load demand, steamflow through the control valves 44 is thereby limited which in turn limits the total flow to the turbine 24. The second limiter 80 therefore prevents excessive flow to the turbine 24 which could possibly damage the turbine 24.

The first and second limiters 78 and 80 in the control system 12 conventionally prevent excessive blowdown in the reactor 10 and excessive flow to the turbine 24 but, prevent both the control valves 44 and the bypass valve 46 from opening past the predetermined limits which assumes that all the control valves 44 are fully operable. However, in the event of failure of one or more of the control valve 44 which prevents them from opening upon demand or causes them to fully or partially close below demand, the pressure in the reactor 10 will undesirably increase since full demanded flow through the collective control valves 44 to the turbine 24 is therefore prevented. In such an occurrence, the pressure regulator 50 will automatically increase the TF demand for increasing flow through the control valves 44 to decrease the rising pressure in the reactor 10. The non-failed control valves 44 will therefore be further opened for increasing the steam flowrate therethrough in an attempt to decrease the increasing pressure within the reactor 10.

However, the TF demand from the pressure regulator 50 will increase only up to the preset limit provided by the first limiter 78 which is based upon the operability of all the control valves 44 including the failed valve. If the reactor 10 is operating at a sufficiently high power level, the steamflow through the operable control valves 44 will reach the limit set by the first limiter 78, and the bypass valve 46 will conventionally be opened to dump a portion of the excessive steamflow to the condenser 48. Furthermore, for high power operation of the reactor 10, the bypass valve 46 can also reach its limiting open value due to the first limiter 78 and therefore, the maximum opening of the non-failed control valves 44 and the bypass valve 46 as limited by the first limiter 78 will be insufficient to avoid excessive reactor pressure increase which will then actuate the conventional reactor protection system (not shown) which will effect a reactor shutdown or scram. Reactor shutdown is undesirable since electrical generating capability will be lost, and since the transition boiling margin will be approached possibly leading to fuel damage from overheating.

The normal capacity of the non-failed operable control valves 44 and of the bypass valve 46 is typically sufficient in a conventional power plant to accommodate failure of a single control valve 44 without requiring reactor shutdown but for the first limiter 78. The first limiter 78 is required as above described to provide safe operation to minimize blowdown, but includes no provision in the event of a failed-closed control valve 44 as above described wherein blowdown is not a concern. In accordance with the present invention, an improved method of operating the reactor 10 includes automatically detecting failure of a failed one of the control valves 44 which passes steamflow therethrough at a flowrate below the demand flowrate therefor, i.e. below CV demand, provided by one of the pressure regulator 50 and the turbine controller 54, and automatically opening the bypass valve 46 upon detecting the failed control valve 44 to a level which can exceed that provided by the first limiter 78. The bypass valve 46 will then channel the excessive steamflow to the condenser 48 wherein it is wasted. In order to prevent such wasted energy, the method further includes the step of automatically reducing power of the reactor 10, for example by reducing the recirculation flow of the water 18 in the reactor 10 to reduce the power level thereof, and therefore reduce the main steamflow 20, which will then allow the open bypass valve 46 to normally close, with required total steamflow being instead channeled solely through the non-failed operable control valves 44. This is all done while still maintaining the safely features of both the first and second limiters 78 and 80.

The method is practiced in accordance with one embodiment of the present invention by providing in the conventional control system 12 means 82 for detecting failure of a failed one of the control valves 44 which passes steamflow therethrough at a flowrate below the CV demand therefor provided by the pressure regulator 50 or the turbine controller 54. The detecting means, or simply valve failure detector 82, may be conventionally implemented in the conventional computer in which the control system 12 is implemented and is effective for detecting a decrease in the steamflow through the turbine 24 when one of the control valves 44 fails to channel its required portion of the total steamflow from the reactor 10. The valve failure detector 82 is operatively joined to the bypass valve 46 and is effective for opening the bypass valve 46 upon detecting the failed control valve 44. In this way the reduction in transition boiling margin leading to fuel bundle overheating may be reduced or eliminated by detecting failure of the failed control valve 44 and suitably opening the bypass valve 46 to dump the excess steamflow to prevent undesirable reactor pressure rise.

The valve failure detector 82 is joined to the conventional control system 12 through a conventional second low value selector or gate 84 operatively joined between the first selector 56 and the bypass comparator 68. The second selector 84 receives the CV demand from the first selector 56 and receives from the valve failure detector 82 an actual turbine flow signal, and is effective for selecting the lesser thereof as a bypass reference signal provided to the comparator 68. During normal operation, the CV demand is provided to the comparator 68 by the second low value selector 84 for normal operation of the control system 12, since the actual turbine flow signal will be substantially equal to the CV demand that it follows. Upon failure of one of the control valves 44, wherein steamflow to the turbine 24 is reduced below CV demand, the actual turbine flow signal indicative of such reduced steamflow is instead provided by the second selector 84 to the comparator 68 which will provide a suitable value of the bypass demand to the bypass valve controller 76 to open the bypass valve 46 without regard for the predetermined limit normally effected by the first limiter 78. However, the first limiter 78 is still effective, nevertheless, to prevent excessive opening of the control valves 44, and of the bypass valve 46 wherein a failure of one of the control valves 44 does not occur.

In the failure of one of the control valves 44 which causes it to fully or partially close below that required for normal operation, steamflow to the turbine 24 will correspondingly decrease and may be suitably observed for providing suitable inputs 86 to the valve failure detector 82 for processing therein. Conventional parameters indicative of steamflow to the turbine 24 include the actual positions of the control valves 44, the collective flowrate through the several control valves 44, the pressure within the first stage shell of the turbine 24 which receives the steamflow from the control valves 44, and the electrical power output from the generator 26, for example. Any one of these inputs 86 may be used to generate the actual turbine flow signal provided by the detector 82 to the second selector 84.

Figure 2:
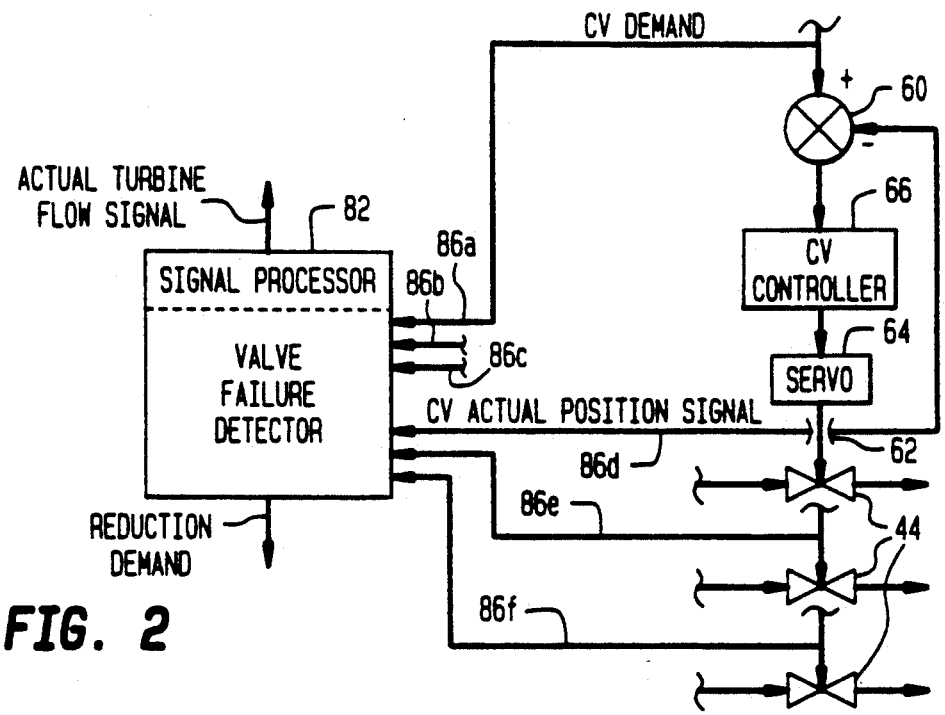
FIG. 2 is a schematic representation of one embodiment of a valve failure detector used in the control system illustrated in FIG. 1.

Illustrated schematically in FIG. 2 is one embodiment of the failure detecting means 82 configured for determining actual steamflow provided to the turbine 24 by monitoring the actual positions of the several control valves 44. More specifically, the detector 82 is operatively joined to the first low value selector 56 for receiving therefrom the respective CV demands designated 86a, b, c which are also provided directly to the respective controller 66 for each of the control valves 44. The detector 82 is also operatively joined to the respective position sensors 62 for each of the control valves 44 for receiving therefrom a control valve (CV) actual position signal designated 86d, e, f which are also provided to the respective comparators 60 for each feedback loop of the respective control valves 44. The detector 82 may include a conventional comparator therein for comparing the respective CV demand and the CV actual position signal for each of the control valves 44 to detect a failure of a control valve 44 based on a predetermined difference therebetween including any appropriate time delay. During normal operation of the control valves 44, the CV demand and the CV actual position signal will be substantially equal to each other except during transient operation wherein the control valves 44 are either being opened or closed. The typical differential between the CV demand and actual position signal including conventional response time may be conventionally provided in the detector 82 so that for differences between the two signals which exceed a predetermined limit, failure of the corresponding control valve 44 will be indicated. For example, if one of the control valves 44 fails fully closed, the CV actual position signal, e.g. 86d, will indicate such closure and will continuously be substantially lower than the respective CV demand, e.g. 86a, which will, therefore, indicate a failure of that control valve 44.

Since each of the control valves 44 has a conventionally determined performance definition with flowrate therethrough being proportional to opening of the control valve 44, then the CV actual position signals from the valves 44 may be used to conventionally determine or calculate the collective actual steamflow through all three control valves 44 to generate the actual turbine flow signal provided to the second selector 84. Accordingly, the detector 82 may include a conventional signal processor therein to generate the actual turbine flow signal based on the CV actual position signal inputs provided thereto.

During the occurrence of a failed control valve 44 having no flow therethrough, for example, the actual turbine flow signal illustrated in FIG. 1 sent to the second low value 84 will be selected over the CV demand which will be higher compared thereto which, in turn, will generate a suitable bypass demand for opening the bypass valve 46 to bypass the excess flowrate from the failed control valve 44 directly to the condenser 48. The non-failed control valves 44 will also be conventionally opened during such failure by the pressure regulator 50 in conventional fashion but their opening values will be limited by the first limiter 78.

As shown in both FIGS. 1 and 2, the failure detecting means 82 are preferably also operatively joined to the RFCS 28 and are effective for reducing the reactor recirculation flow for reducing the main steamflow 20 through the steamline 22 upon detecting the control valve failure. The detector 82 conventionally provides a suitable reduction demand signal to the master controller 38 which in turn is used by the flow controller 40 for suitably closing the control valve 32 to decrease recirculation flow through the core 16 for reducing power output from the reactor 10. Alternatively, the speed of the recirculation pump 30 may instead be regulated to control the recirculation flow in a conventional manner. As power from the reactor 10 is reduced, the steamflow 20 is reduced in turn, and the control system 12 will enter a new equilibrium condition allowing the bypass valve 46 to automatically close, with the required lower total steam flowrate then being channeled through the non-failed operable control valves 44 to the turbine 24 for operation at reduced power. In this way, the bypass valve 46 may be initially opened upon failure of one of the control valves 44 to bypass the excessive steamflow to the condenser 48 and prevent undesirable reactor pressure rise which would otherwise effect a reactor scram. The opening of the bypass valve 46 is not limited by the first limiter 78 in this situation. The bypass valve 46 then automatically closes and prevents the wasting of the steamflow directly in the condenser 48. A suitable failure message may be conventionally sent to the plant control room so that appropriate corrective action for the failed control valve 44 may be taken. The invention, therefore, prevents reactor scram which would otherwise occur, and places the plant in a reduced power output mode of operation and allows the failed control valve to be repaired without reactor shutdown.

Figure 3:
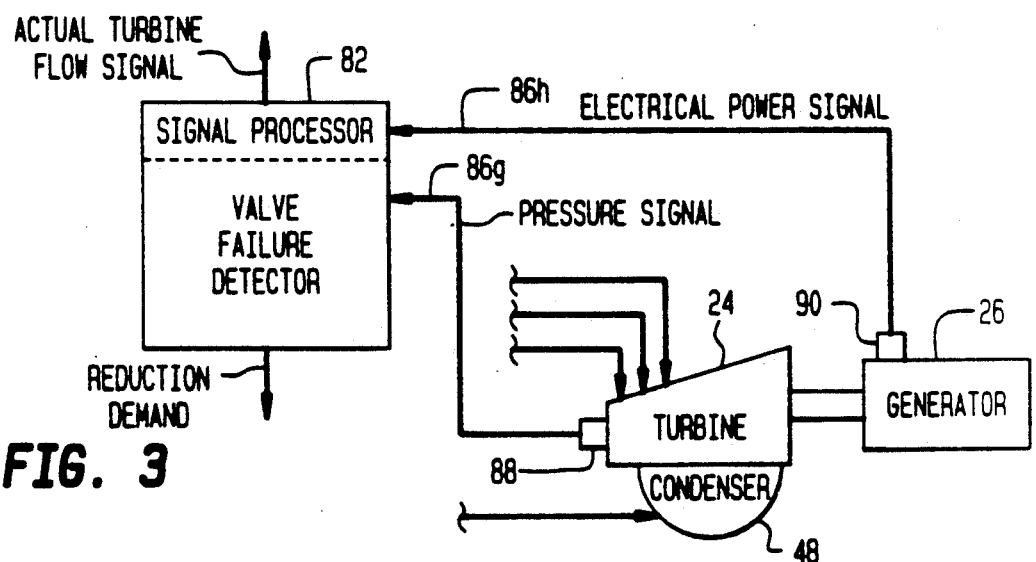
FIG. 3 is a schematic representation of second and third embodiments of a valve failure detector used in the control system of FIG. 1.

Illustrated schematically in FIG. 3 is a second embodiment of the failure detecting means 82 which alternatively include a conventional pressure sensor 88 joined to the turbine 24 for conventionally providing a pressure signal for the main steam inside the first stage shell of the turbine 24 which is indicative of the total steam flowrate thereto. The detector 82 is operatively joined to the pressure sensor 88 for receiving therefrom the pressure signal as an input 86g, and is effective for comparing the pressure signal with a predetermined reference value thereof stored therein to detect the control valve failure based on a predetermined difference therebetween. Upon detecting a control valve failure which fails to provide the required steam flowrate to the turbine 24 in response to the CV demand, the signal processor of the detector 82 will conventionally generate the actual turbine flow signal provided to the second selector 84 based on the monitored pressure signal from the sensor 88. A suitable reduction demand signal will also be sent to the master controller 38 for reducing the power of the reactor 10 to allow the bypass valve 46 to close after it is initially opened to prevent undesirable reactor pressure rise.

Also illustrated in FIG. 3 is a third embodiment of the present invention which alternatively includes a conventional electrical power sensor 90 operatively joined to the generator 26 for providing an electrical power signal indicative of generator output power as an input 86h to the detector 82. The output power of the generator 26 is also related to the steamflow to the turbine 24 and a decrease in the power of the generator 26 may be used to indicate failure of one of the control valves 44. The detector 82 compares the electrical power signal from the sensor 90 to a predetermined reference electrical power value thereof to detect the control valve failure based on a predetermined difference therebetween. Again, upon detecting the control valve failure, the signal processor of the detector 82 will provide a suitable actual turbine flow signal to the second selector 84 based on the monitored electrical power signal from the sensor 90 for opening the bypass valve 46, and, a suitable reduction demand signal is also sent to the master controller 38 for reducing power of the reactor 10 to allow the bypass valve 46 to close after preventing undesirable reactor pressure increase.

Figure 4:
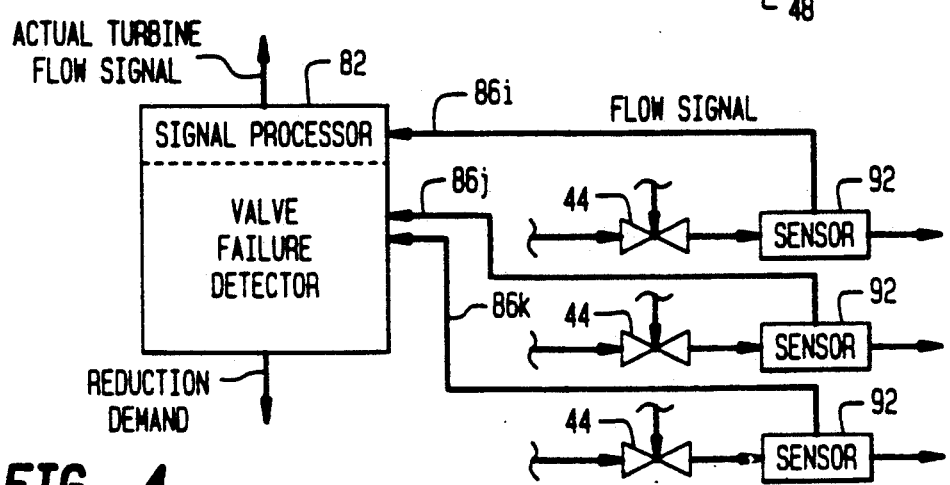
FIG. 4 is a schematic representation of a fourth embodiment of a valve failure detector used in the control system of FIG. 1.

Illustrated schematically in FIG. 4 is yet another, fourth embodiment of the present invention which alternatively includes a plurality of conventional flow sensors 92 each joined in serial flow communication between a respective one of the control valves 44 and the turbine 24 for providing an actual flow signal indicative of the main steamflow through each of the control valves 44, i.e. 86$i$, $j$, $k$. The detector 82 is again effective for comparing each of the flow signals 86$i$, $j$, $k$ from the respective sensors 92 with predetermined reference values thereof to detect a control valve failure based on a predetermined difference therebetween. Upon detecting the failure, the signal processor of the detector 82 will provide a suitable actual turbine flow signal to the second selector 84 for again opening the bypass valve 46 to prevent undesirable pressure rise in the pressure vessel 14.

Similarly, the signal processor of the detector 82 provides a suitable reduction demand signal through the master controller 38 to the RFCS 28 for reducing the main steamflow from the reactor 10 to allow the bypass valve 46 to close after initially preventing undesirable pressure rise within the pressure vessel 14.

The flow sensors 92 may be any conventional sensor including conventional flow venturis which are effective for accurately indicating flowrate, or could be acoustic noise monitors which less accurately indicate flowrate as being either normal or abnormal depending on noise generation.

The reduction demand signal provided by the detector 82 to the master controller 38 in all the above examples could be either proportionately related to the decreased ability of the failed control valve 44 to channel its required flowrate, or, in the preferred embodiment, reduces the main steamflow through the steamline 28 in a value attributed to a maximum, normal contribution of a single one of the control valves 44. Since each control valve 44 is predeterminedly sized and limited in flowrate by the first limiter 78, the reduction demand signal from the detector 82 may simply effect a decrease in total steam flowrate through the steamline 22 attributed to the maximum normal contribution of the failed control valve 44. For example, each of the three control valves 44 may be identical for each providing one third of the total required flowrate to the turbine 24. Upon failure of one of the control valves 44, the reduction demand signal provided to the master controller 38 may simply reduce the total flowrate by one third.

In another embodiment of the invention as shown in FIG. 1, the reduction demand signal may also be provided to a conventional rod control and information system (RCIS) 94 which controls insertion and withdrawal of conventional control rods 96 by a conventional control rod drive 98 (only one of several being shown). In accordance with the method, power may be reduced in the reactor 10 by suitably inserting the control rods 96 to reduce the main steamflow 20 upon detection of a failure of one of the control valves 44. This will allow the bypass valve 46 to normally close while the non-failed control valves 44 are additionally opened in accordance with the invention described above. The reduction demand signal may be provided by the detector 82 to either or both the RFCS 28 and the RCIS 94 for reducing reactor power in a conventional manner.

In yet another embodiment wherein the reactor 10 is in the form of a natural circulation BWR without the RFCS 28, power reduction can be effected by providing the reduction demand signal from the detector 82 solely to the RCIS 94.

Accordingly, the control system 12 described above is otherwise conventional except for providing the valve failure detector 82, the second low value selector 84, and related components therein so that conventional normal operation of the control system 12 may occur including the limits provided by the first and second limiters 78 and 80. However, during a failure of one of the control valves 44, the second low value selector 84 provides the actual turbine flow signal as the bypass reference signal to the bypass comparator 68 instead of the normal CV demand ordinarily provided thereto. The lower bypass reference signal will cause the bypass valve 46 to open to prevent undesirable reactor pressure rise, and then reactor power level may be decreased for allowing the bypass valve 46 to close to prevent wasting of the steamflow in the condenser 48 and allowing operation of the reactor 10 at reduced power consistent with the steamflow capability of the non-failed, operable control valves 44. The logic within the detector 82, therefore, effects automatic bypass operation as well as automatic power decrease of the reactor 10 to a level where the bypass valve 46 may be fully closed and the reactor steamflow is within the capability of the unfailed control valves 44.

The invention may be implemented in any conventional fashion, for example in the conventional control system components or computer provided for implementing the pressure control system, the turbine control system, the bypass control system, the RFCS 28, and the RCIS 94. And, the various levels of conventional redundancy in the control system may also be provided. For example, the pressure control system including the pressure regulator 50 is typically provided with double redundancy, and the control valve feedback loops are typically provided with triple redundancy for each control valve 44. And, the valve failure detector 82 and its associated components may also be provided in double or triple redundancy as desired.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A control system comprising:
   a nuclear reactor operable for heating water to generate main steam under pressure, and disposed in flow communication with a steam turbine by a main steamline for discharging thereto said main steam;
   a plurality of flow control valves disposed in parallel flow communication in said steamline for controlling flow of said main steam from said reactor to said turbine;
   a bypass valve disposed in flow communication with said steamline upstream of said control valves and with a condenser of said turbine for selectively bypassing a portion of said main steam as bypass steam around said control valves and turbine to said condenser;
   a pressure regulator operatively joined to said control valves and said bypass valve for controlling flow of said main steam to said turbine;
   a turbine controller operatively joined to said control valves and said bypass valve for controlling flow of said main steam to said turbine in conjunction with said pressure regulator; and
   means for automatically detecting failure of one of said control valves which passes steamflow therethrough at a flowrate below a control valve (CV) flow demand therefor, said failure detecting means being operatively joined to said bypass valve and being effective for opening said bypass valve upon detecting said control valve failure.

2. A system according to claim 1 further comprising:
   a first low value selector operatively joined between said pressure regulator and said turbine controller for receiving a total flow (TF) demand from said pressure regulator and a load demand from said turbine controller, and for selecting the lesser thereof as said CV flow demand for controlling flowrate of said control valves;
   a first limiter operatively joined between said pressure regulator and said first selector for providing a predetermined limit to said TF demand;
   a second low value selector operatively joined between said first selector and said failure detecting means for receiving said CV flow demand from said first selector and an actual turbine flow signal from sid failure detecting means, and for selecting the lesser thereof as a bypass reference; and
   a bypass comparator operatively joined to said first limiter, said second selector, and said bypass valve for obtaining a difference between said TF demand and said bypass reference as a bypass demand, said bypass demand being provided to said bypass valve for controlling operation thereof.

3. A system according to claim 2 further comprising for each of said control valves:
- a CV controller operatively joined to said first limiter for receiving therefrom said CV demand, and operatively joined to said control valve for controlling opening thereof;
- a position sensor for providing a CV actual position signal of said control valve; and
- wherein said failure detection means are operatively joined to said first selector for receiving therefrom said CV demand, and operatively joined to said position sensor for receiving therefrom said CV actual position signal, and effective for comparing said CV demand and said CV actual position signal to detect said CV failure based on a predetermined difference therebetween, and, upon detecting said control valve failure, are effective for generating said actual turbine flow signal based upon said CV actual position signals for said plurality of control valves.

4. A system according to claim 2 further comprising a pressure sensor joined to said turbine for providing a pressure signal for said main steam inside said turbine; and
- wherein said failure detecting means are operatively joined to said pressure sensor for receiving therefrom said pressure signal, and are effective for comparing said pressure signal with a predetermined reference value thereof to detect said control valve failure based on a predetermined difference therebetween, and, upon detecting said control valve failure, are effective for generating said actual turbine flow signal based upon said pressure signal.

5. A system according to claim 2 further comprising an electrical power sensor joined to said generator for providing an electrical power signal from said generator; and
- wherein said failure detecting means are operatively joined to said power sensor for receiving therefrom said electrical power signal, and are effective for comparing said power signal with a predetermined reference value thereof to detect said control valve failure based on a predetermined difference therebetween, and, upon detecting said control valve failure, are effective for generating said actual turbine flow signal based upon said electrical power signal.

6. A system according to claim 2 further comprising a plurality of flow sensors each joined in serial flow communication between a respective one of said control valves and said turbine for providing an actual flow signal for said main steamflow through said control valves; and
- wherein said failure detecting means are operatively joined to said flow sensors for receiving therefrom said flow signals, and are effective for comparing said flow signals with predetermined reference values thereof to detect said control valve failure based on a predetermined difference therebetween, respectively, and, upon detecting said control valve failure, are effective for generating said actual turbine flow signal based upon said flow signals.

7. A system according to claim 6 further including a recirculation flow control system (RFCS) operatively joined to said reactor for selectively varying recirculation flow of said water in said reactor for controlling flowrate of said main steam therefrom;
- wherein said failure detecting means are operatively joined to said RFCS, and are effective for reducing said reactor recirculation flow for reducing said main steamflow through said steamline upon detecting said control valve failure.

8. A system according to claim 6 further including a control rod positionable in said reactor by a control rod drive and controlled by a rod control system, and said failure detection means are operatively joined to said rod control system and effective for inserting said control rod into said reactor for reducing power to reduce said main steamflow.

9. A system according to claim 8 wherein said failure detecting means are effective for providing a reduction demand to said RFCS for reducing said main steamflow from said reactor in a reduction value attributed to a maximum, normal contribution of a single one of said control valves.

10. A method of operating a nuclear reactor joined in flow communication with a steam turbine by a main steamline having a plurality of control valves for controlling main steamflow to said turbine, and bypass valve for selectively bypassing a portion of said main steamflow around said control valves and said turbine to a condenser, said control valves and bypass valve being controlled by a pressure regulator and a turbine controller; said method including the steps of:
- automatically detecting failure of one of said control valves which passes steamflow therethrough at a flowrate below a demand flowrate provided by one of said pressure regulator and said turbine controller; and
- automatically opening said bypass valve upon detecting said control valve failure.

11. A method according to claim 10 further including the step of automatically reducing power in said reactor to reduce said main steamflow to cause said open bypass valve to close.

* * * * *